US011882395B2

(12) United States Patent
Bartlett et al.

(10) Patent No.: US 11,882,395 B2
(45) Date of Patent: Jan. 23, 2024

(54) DEVICE WITH A MICROPHONE AND A CONDENSATION COLLECTION APPARATUS TO PREVENT MIGRATION OF CONDENSATION TO THE MICROPHONE

(71) Applicant: MOTOROLA SOLUTIONS, INC., Chicago, IL (US)

(72) Inventors: Rammone Bartlett, Chicago, IL (US); Deborah A. Gruenhagen, Chicago, IL (US); Adrian F. Rubio, Chicago, IL (US); Andrew P. Miehl, Chicago, IL (US); Gary A. Lee, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 50 days.

(21) Appl. No.: 17/836,323

(22) Filed: Jun. 9, 2022

(65) Prior Publication Data

US 2023/0403491 A1 Dec. 14, 2023

(51) Int. Cl.
*H04R 1/08* (2006.01)

(52) U.S. Cl.
CPC .......... *H04R 1/086* (2013.01); *H04R 2499/11* (2013.01)

(58) Field of Classification Search
CPC ............................ H04R 1/086; H04R 2499/11
See application file for complete search history.

(56) References Cited

U.S. PATENT DOCUMENTS

| | | | | |
|---|---|---|---|---|
| 8,494,577 B2 | 7/2013 | Shiogama et al. | | |
| 9,078,063 B2 | 7/2015 | Loeppert et al. | | |
| 9,628,929 B2 | 4/2017 | Salvia et al. | | |
| 9,930,435 B2 | 3/2018 | Miehl et al. | | |
| 10,779,067 B2 | 9/2020 | Harmke et al. | | |
| 2013/0108082 A1* | 5/2013 | Dave | H04R 1/086 | 381/122 |
| 2014/0226826 A1* | 8/2014 | Utterman | H04R 1/086 | 381/55 |
| 2016/0360333 A1 | 12/2016 | Higgins et al. | | |
| 2016/0366505 A1* | 12/2016 | Saw | H04R 1/086 | |
| 2019/0058934 A1 | 2/2019 | Yan et al. | | |

* cited by examiner

*Primary Examiner* — Tuan D Nguyen
(74) *Attorney, Agent, or Firm* — PETTRY + CURRIER, INC.

(57) ABSTRACT

A device with a microphone and a condensation collection apparatus to prevent migration of condensation to the microphone is provided. The device comprises a microphone; a board having an acoustic port therethrough, the microphone positioned to accept sound through the acoustic port; a moisture-resistant, acoustically transparent membrane over the acoustic port; an outer membrane that receives the sound for the microphone, the outer membrane being non-permeable to at least moisture; and a condensation collection apparatus between the outer membrane and the acoustically transparent membrane. The condensation collection apparatus comprises: an aperture through which the sound from the outer membrane passes; and one or more condensation collection features, at an outer-membrane facing side of the condensation collection apparatus, configured to: collect condensation that migrates from an inner side of the outer membrane; and prevent migration of the condensation, that is collected, through the aperture.

16 Claims, 7 Drawing Sheets

DEVICE WITH A MICROPHONE AND A CONDENSATION COLLECTION APPARATUS TO PREVENT MIGRATION OF CONDENSATION TO THE MICROPHONE

BACKGROUND OF THE INVENTION

A portable electronic device and/or communication device that includes a microphone may often be exposed to rapid changes in temperature that can cause moisture to condense on an inner surface of an outer acoustic membrane. When the condensation migrates to the microphone, to which sound is conveyed from the outer acoustic membrane, the microphone may be damaged and/or sound detected by the microphone may be degraded.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
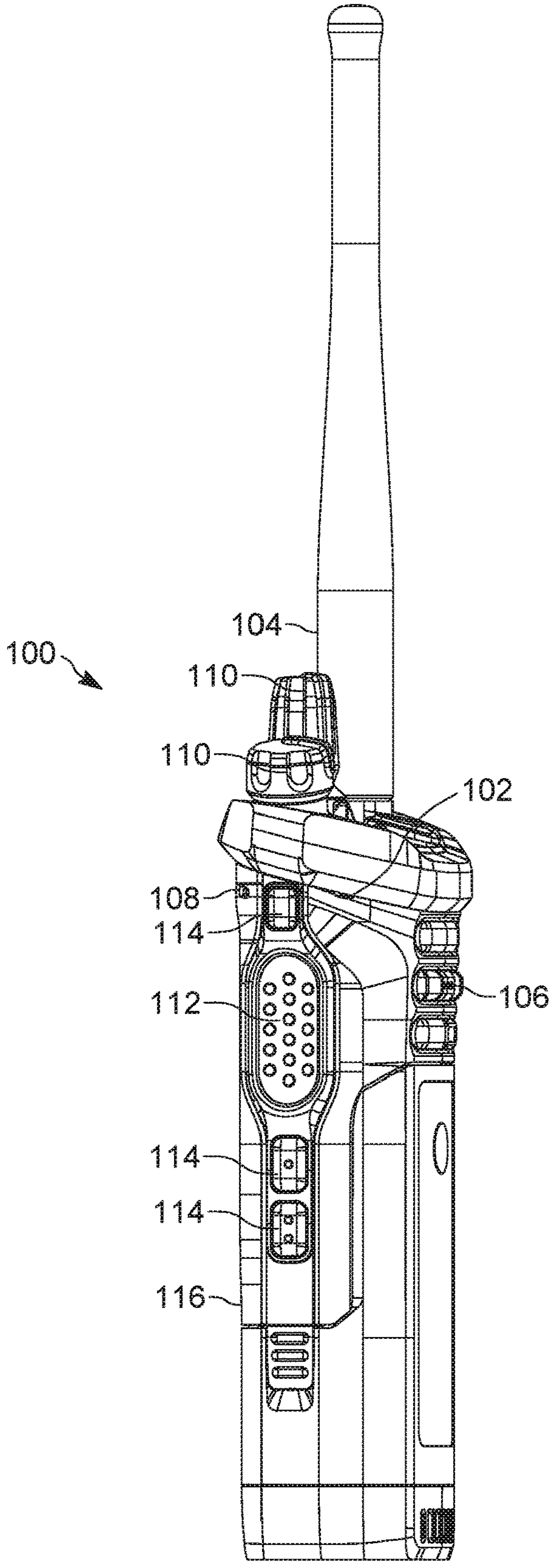
FIG. 1 is a perspective view of a communication device that includes a device with a microphone and a condensation collection apparatus to prevent migration of condensation to the microphone, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

A portable electronic device and/or communication device, and the like, that includes a microphone, may often be exposed to rapid changes in temperature that can cause moisture to condense on an inner surface of an outer acoustic membrane. When the condensation migrates to the microphone, to which sound is conveyed from the outer acoustic membrane, the microphone may be damaged and/or sound detected by the microphone may be degraded. Such a situation is particularly problematic when the portable electronic device and/or communication device is operated by a first responder, such as a fire fighter, as first responders are often in mission-critical situations that require accurate and/or reliable communications. The situation may also be particularly problematic when the microphone is a microelectromechanical systems (MEMs) microphone as such MEMs microphones may be particularly susceptible to water damage. Thus, there exists a need for an improved device and/or portable electronic device and/or communication device with a microphone and a condensation collection apparatus to prevent migration of condensation to the microphone.

Hence, provided herein is a device that includes a microphone, an outer membrane that receives the sound for the microphone, the outer membrane being non-permeable to at least moisture, and a condensation collection apparatus between the outer membrane and the microphone. In particular, the device further includes an acoustically transparent membrane over an acoustic port, behind which the microphone may be mounted, the acoustically transparent membrane being moisture-resistant, and the condensation collection apparatus being between the outer membrane and the acoustically transparent membrane. The condensation collection apparatus comprises: an aperture through which the sound received at the outer membrane passes; and one or more condensation collection features at an outer-membrane facing side of the condensation collection apparatus. The one or more condensation collection features are generally configured to: collect condensation that migrates from an inner side of the outer membrane; and prevent migration of the condensation, that is collected, through the aperture.

For example, the one or more condensation collection features may comprise ridges and/or depressions which collect the condensation and/or cause the condensation to move in directions away from the aperture, and the like. In particular, the one or more condensation collection features cause the condensation collection apparatus to have an increased surface area at an outer side and/or an outer membrane facing side, as compared to a flat surface.

The device that includes the condensation collection apparatus may be incorporated into a portable electronic device and/or communication device, and/or any other suitable electronic device, and the like, that includes a microphone. Hereafter, reference will be made to a communication device which is understood to include the device that includes the condensation collection apparatus, and such a communication device may comprise any suitable portable electronic device and/or communication device, and/or any other suitable electronic device, and the like.

Such a communication device, and the like, may generally be sealed against water, and/or other liquids, such as rain, and/or water from fire fighter hoses, and the like. Such a communication device may hence be referred to as having an internal "dry-side" and external "wet-side". At the internal dry-side, internal components are generally protected from external water. At the external wet-side, external components are generally waterproof to minimize risk of damage when they are exposed to external water.

In some examples such a communication device may include ports, and the like, to equalize pressure inside the portable electronic device with atmospheric pressure. However, such ports may be air-permeable, but at least water resistant; similarly such ports may be air-permeable and may not be water-permeable. Nonetheless, water vapor (e.g. in air) may enter the portable electronic device through such ports. Alternatively, when the communication device is sealed and/or air tight, water vapor may nonetheless be present inside the communication device and/or at the otherwise dry-side of the communication device.

Such air vapor may condense on an inner side of the outer membrane when an outer side of the outer membrane is exposed to temperature changes, such as sudden drops in temperature which may occur in public safety incidents, such as fire-fighting incidents, and the like. Condensation that collects on the inner side of the outer membrane may fall from the outer membrane, and/or be shaken from the outer membrane, and/or migrate into the device, towards the microphone, in any suitable manner. The condensation collection apparatus assists at collecting such migrating condensation, and/or assists at preventing such migrating condensation from migrating to the microphone.

An aspect of the present specification provides a device comprising: a microphone; a board having an acoustic port therethrough, the microphone positioned to accept sound through the acoustic port; an acoustically transparent membrane over the acoustic port, the acoustically transparent membrane being moisture-resistant; an outer membrane that receives the sound for the microphone, the outer membrane being non-permeable to at least moisture; and a condensation collection apparatus between the outer membrane and the acoustically transparent membrane, the condensation collection apparatus comprising: an aperture through which the sound from the outer membrane passes; and one or more condensation collection features at an outer-membrane facing side of the condensation collection apparatus, the one or more condensation collection features configured to: collect condensation that migrates from an inner side of the outer membrane; and prevent migration of the condensation, that is collected, through the aperture.

The microphone, board, acoustically transparent membrane, outer membrane, condensation collection apparatus, etc., of the device may be incorporated into one or more of a portable public safety radio, a body-wearable communication device, a remote speaker microphone (RSM), and the like, such that the device may further comprise one or more of: a portable public safety radio, a body-wearable communication device, an RSM, and the like.

Each of the above-mentioned embodiments will be discussed in more detail below, starting with an example system and device architectures of the system in which the embodiments may be practiced.

Further advantages and features consistent with this disclosure will be set forth in the following detailed description, with reference to the figures.

Herein, the terms water and moisture are generally used interchangeably, such that "moisture" may refer to "water" and vice versa. Hence, properties of various materials and/or components described herein as being moisture-resistant and/or hydrophobic are understood to, respectively, be water-resistant and/or repel water. Similarly, properties of various materials and/or components described herein as being hydrophilic are understood to attract water.

Furthermore, the terms "outer side" and "inner side" are generally used herein to indicate a direction in which a side of a component is facing. For example, an outer side of a component is understood to be facing towards the wet-side and/or an external side of a device, while an inner side of a component is understood to be facing towards inwards and/or into the device, in a direction opposite to the wet-side and/or the external side of the device.

Similarly, the terms "wet-side" and "dry-side" are generally used herein to respectively indicate an external side of a device, which is exposed to external moisture, and an interior of the device, which is generally protected from external moisture.

Furthermore, hereafter various components are described as being mounted and/or otherwise attached to one another. It is understood that such mounting, and the like, may occur using any suitable combination of glue, epoxy, and/or other mounting material, solder, and the like, and which may depend on a material of the components.

Attention is directed to FIG. 1, which depicts a perspective of a communication device 100 that includes a port behind which is located a device 102, which, as will be explained hereafter, includes a microphone and condensation collection apparatus to prevent migration of condensation to the microphone.

As depicted, the communication device 100 comprises a portable electronic device, for example a radio device, and/or a portable public safety radio, for use by first responders, such as firefighters, and the like. However, the communication device 100 may include any suitable communication device into which the device 102 may be incorporated, including, but not limited to a remote speaker microphone, a body-wearable communication device, a cell phone, and the like. For example, the communication device 100 may comprise a remote speaker microphone and/or the communication device 100 may comprise a body-wearable communication device and/or the communication device 100 may comprise a cell phone, with a housing, and the like, of the communication device 100 adapted accordingly.

Figure 7:
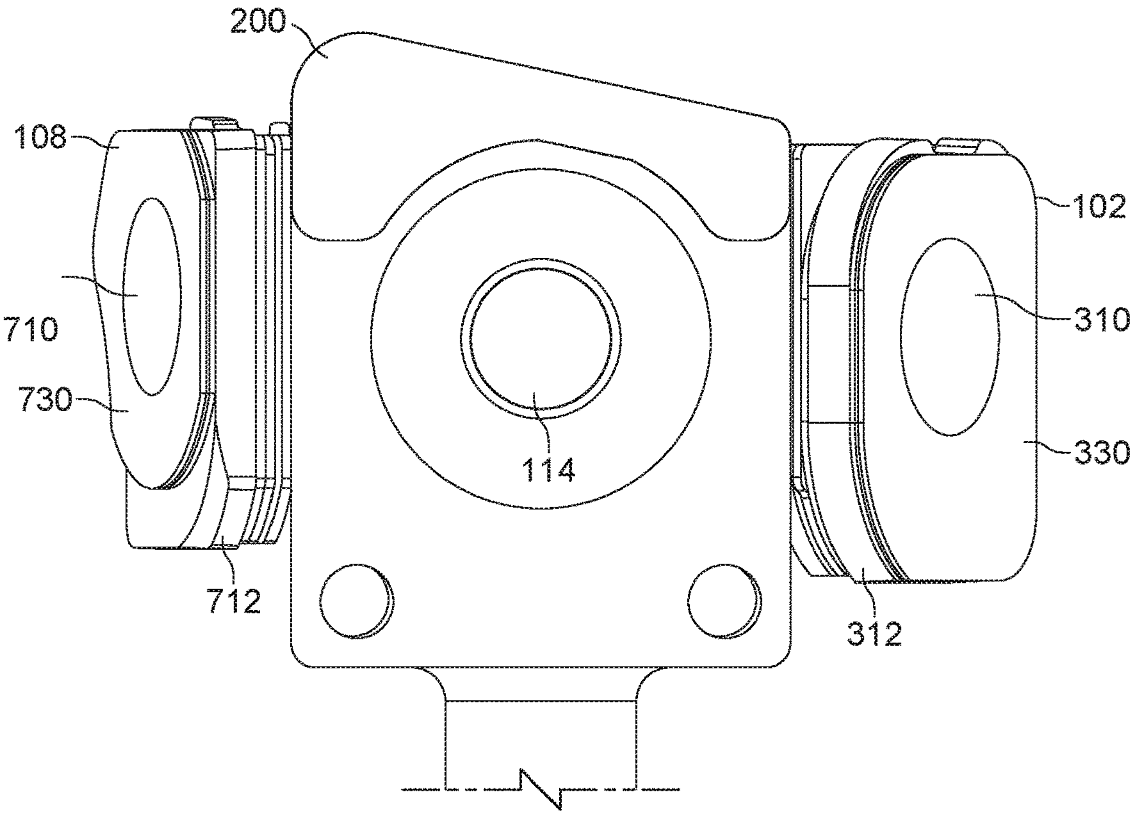
FIG. 7 depicts a front view of a portion of a flex-PCB that includes two devices with a respective microphone and a respective condensation collection apparatus, in accordance with some examples.
Figure 8:
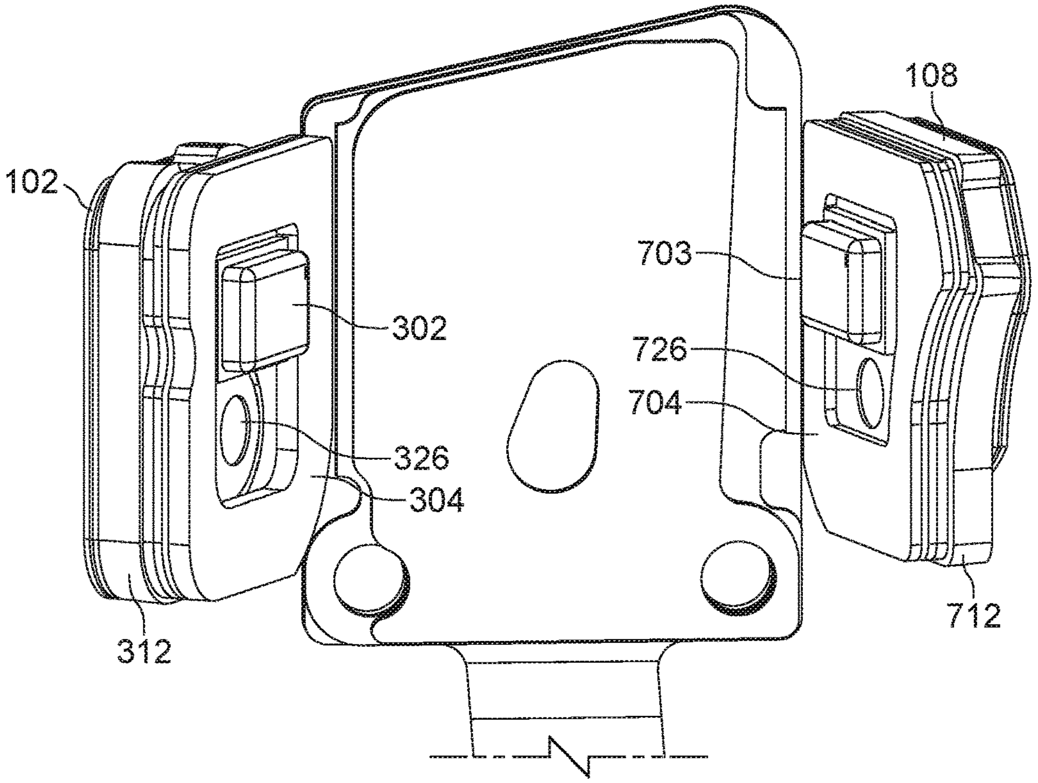
FIG. 8 depicts a rear view of a portion of a flex-PCB that includes two devices with a respective microphone and a respective condensation collection apparatus, in accordance with some examples.

Furthermore, while as depicted the device 102 is at a particular location at the communication device 100, the device 102 may be located in any suitable location of the communication device 100, and/or more than one device 102 may be incorporated into the communication device 100 (for example, see FIG. 7 and FIG. 8).

As depicted, the communication device 100 includes other components used for communication, and, in particular, wireless communication, including, but not limited to, an antenna 104, a speaker 106 (e.g. behind a respective port), an optional further device 108 (which may include a microphone and be similar to the device 102), one or more knobs 110 and/or input devices and the like, for communication channel selection, volume and the like, a push-to-talk (PTT) button 112, and the like, as well as other buttons 114 for implementing other functionality of the communication device 100. Furthermore, the communication device 100 may include any other suitable components for wireless and/or wired communication including, but not limited to, any suitable combination of transceivers, controllers, and the like, as well as other microphones, speakers and the like. However, components of the communication device 100 may be adapted according to any suitable functionality and/or configuration thereof.

As depicted, the communication device 100 comprises a housing 116 through which ports associated with the device 102, the speaker 106, the optional further device 108, and the like are located, as well as external components of the buttons 112, 114, and the like.

Figure 2:
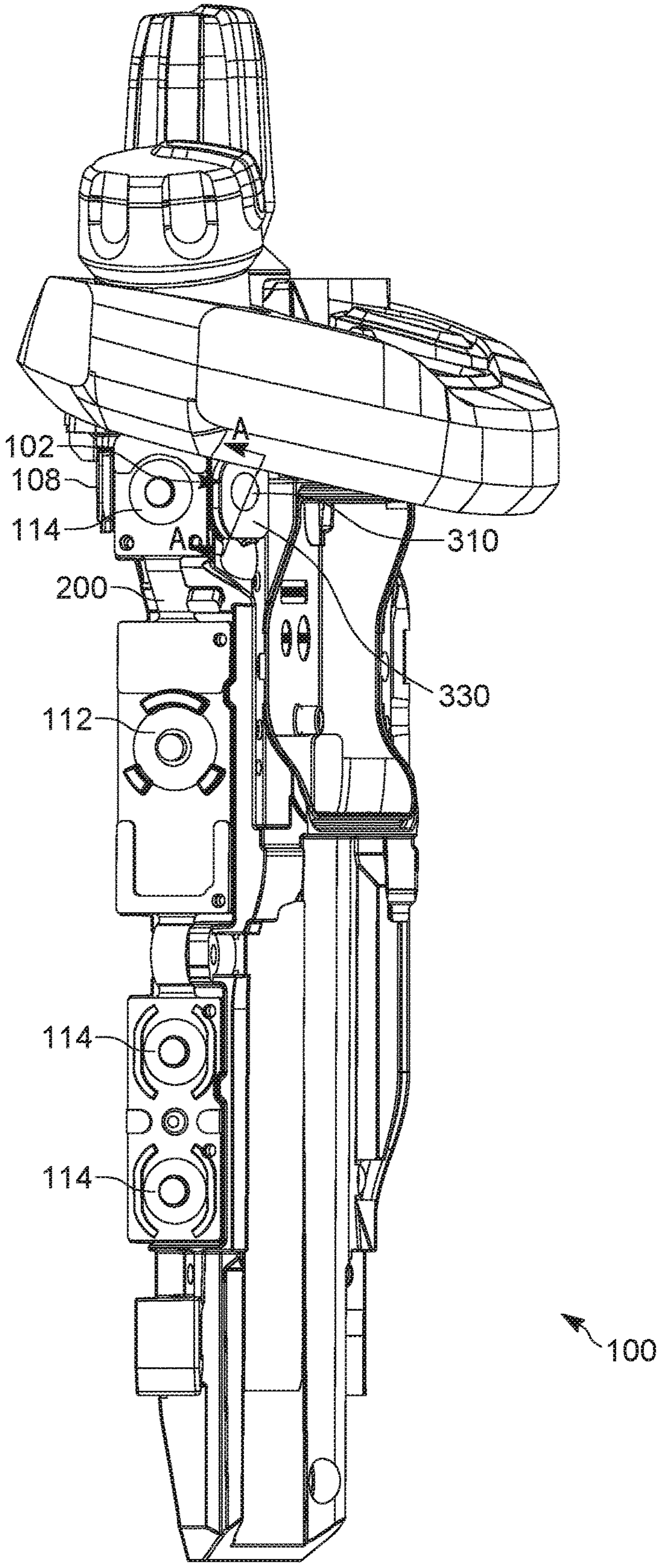
FIG. 2 is a perspective view of the communication device of FIG. 1, with a housing and other components removed, in accordance with some examples.

Attention is next directed to FIG. 2 which depicts a perspective view of the communication device 100 with the housing 116 removed to better show the device 102. For visual clarity, other components of the communication device 100 are also removed in FIG. 2, such as the antenna 104, the speaker 106, etc. FIG. 2 further illustrates that, in the depicted example, the device 102 may be mounted to, and/or be incorporated with, a printed circuit board (PCB) and, in particular, a flex-PCB 200. Other components of the communication device 100 may be mounted to, and/or be incorporated with the flex-PCB 200, such as internal components of the buttons 112, 114, and the like.

Figure 3:
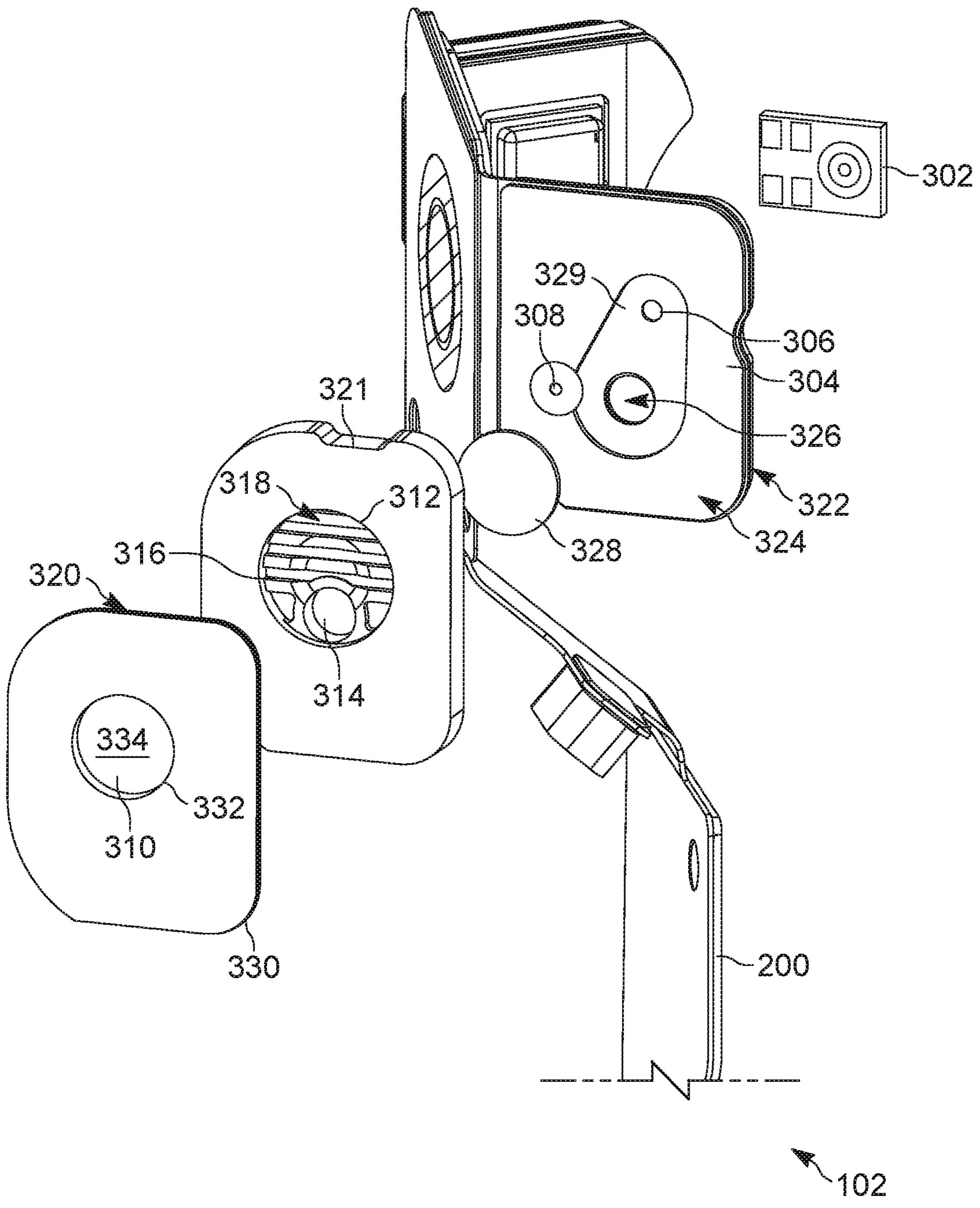
FIG. 3 depicts a perspective of an exploded view of a device with a microphone and a condensation collection apparatus, in accordance with some examples.
Figure 4:
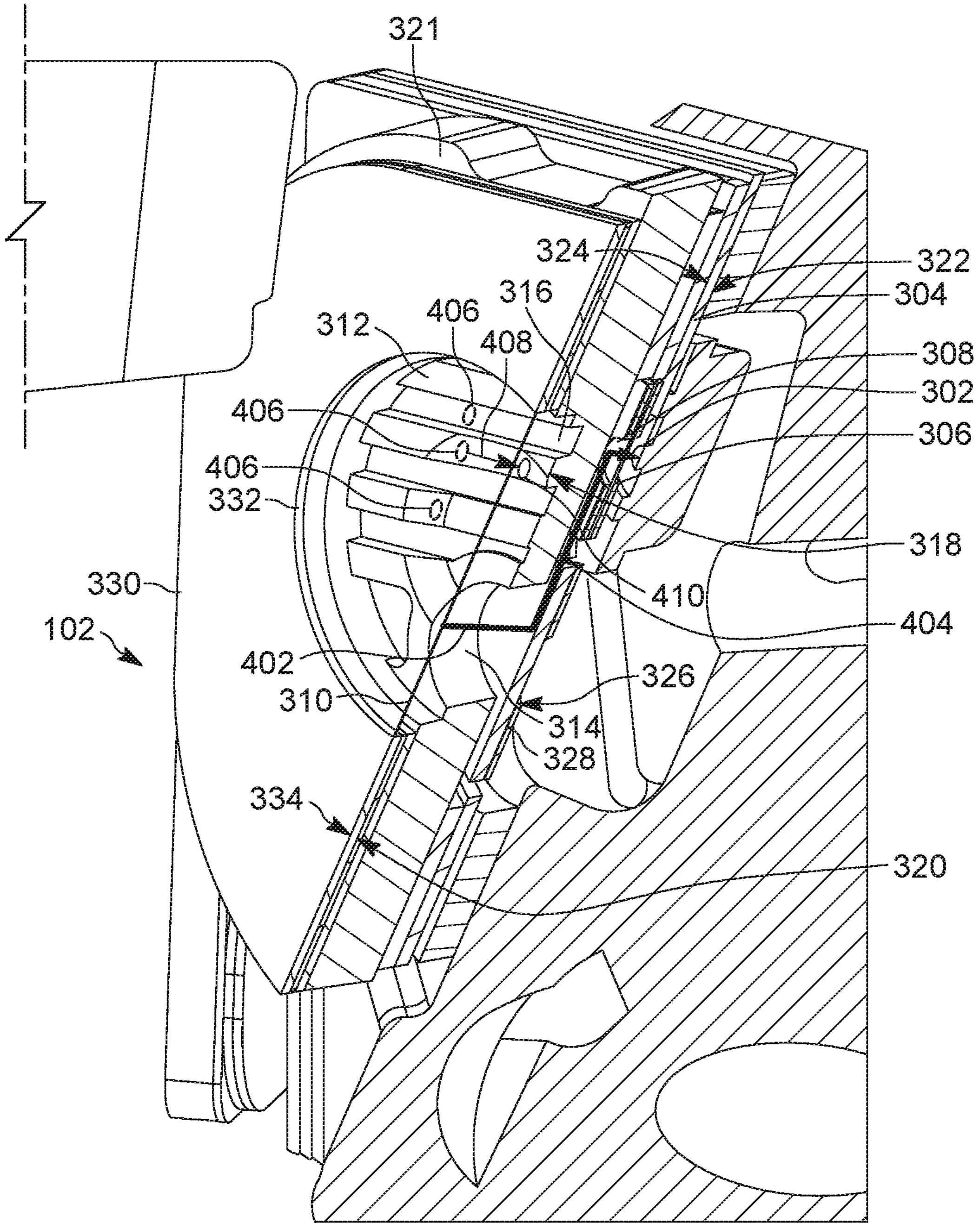
FIG. 4 depicts a perspective of a cross-section of exploded view of the device with a microphone and a condensation collection apparatus, through a line A-A of FIG. 2, in accordance with some examples.

Attention is next directed to FIG. 3 and FIG. 4 which respectively depict an exploded view of the device 102, and a cross-section of the device 102 through a line A-A of FIG. 2.

The device 102 comprises: a microphone 302; a board 304 having an acoustic port 306 therethrough, the microphone 302 positioned to accept sound through the acoustic port 306; an acoustically transparent membrane 308 over the acoustic port 306, the acoustically transparent membrane 308 being moisture-resistant; an outer membrane 310 (also visible in FIG. 2) that receives the sound for the microphone 302, the outer membrane being non-permeable to at least moisture; and a condensation collection apparatus 312 between the outer membrane 310 and the acoustically transparent membrane 308, the condensation collection apparatus 312 comprising: an aperture 314 through which the sound from the outer membrane 310 passes; and one or more condensation collection features 316 at an outer-membrane facing side 318 of the condensation collection apparatus 312, the one or more condensation collection features 316 configured to: collect condensation that migrates from an inner side 320 of the outer membrane 310 (the inner side 320 best seen in FIG. 4); and prevent migration of the condensation, that is collected, through the aperture 314.

As depicted, the condensation collection apparatus 312 further comprises a frame 321 supporting the one or more condensation collection features 316, etc.

The components of the device 102 are next described in more detail.

The microphone 302 is generally mounted on a side 322 of the board 304 opposite the acoustically transparent membrane 308. In some examples, as depicted, the microphone 302 may comprises a micro-electromechanical systems (MEMs) microphone and/or a bottom ported MEMs microphone. However, the microphone 302 may comprise any suitable microphone. In some examples, the microphone 302 may be provided in a package (e.g. as depicted in FIG. 8).

The board 304 may comprise a portion of the flex-PCB 200, and/or the board 304 may comprise any other suitable planar material, and/or combination of planar materials, that may be attached to the flex-PCB 200.

The acoustically transparent membrane 308 may comprises one or more of a hydro-phobic material and a polytetrafluoroethylene (PTFE) based material, and/or any other suitable material which conveys sound therethrough, and which is also moisture-resistant. The acoustically transparent membrane 308 may be of any suitable thickness which conveys sound therethrough, and which may depend on a type of material of the acoustically transparent membrane 308.

As depicted, the acoustically transparent membrane 308 and the microphone 302 are mounted on opposite sides of the board 304, for example such that the acoustically transparent membrane 308 covers the acoustic port 306, and the microphone 302 receives sound through the acoustic port 306. For example, the acoustically transparent membrane 308 may be attached to a frame, and/or supporting material, which is mounted (e.g. using glue, epoxy, and the like) at an outer side 324 of the board 304, and the microphone 302 may be mounted (e.g. using glue, epoxy, and the like) to the inner side 322 of the board 304. In general, the acoustically transparent membrane 308 assists at preventing moisture and/or condensation, that migrates into the device 102, from reaching the microphone 302.

As depicted, the device 102 may further comprise: a pressure equalization port 326 through the board 304; and an acoustically resistant membrane 328 over (e.g. covering and/or mounted over) the pressure equalization port 326, the acoustically resistant membrane 328 being moisture-resistant. In general, the acoustically resistant membrane 328 resists transmission of sound therethrough, but otherwise allows for air pressure on either side of the board 304 to equalize, to assist with functionality of the microphone 302 (e.g. otherwise if air pressure at the sides 322, 324 of the board 304 were different, the microphone 302 may not properly function). The sound resistance of the acoustically resistant membrane 328 is generally to prevent sound from passing through the pressure equalization port 326 and/or to the assist with conveying sound to the microphone 302 (e.g. and not through the pressure equalization port 326). The acoustically resistant membrane 328 may comprise any suitable water-resistant and/or hydrophobic material, including, but not limited to expanded PTFE (EPTFE), amongst other possibilities. The acoustically resistant membrane 328 may be of any suitable thickness that allows for air pressure on either side of the board 304 to equalize, and which may depend on a type of material of the acoustically resistant membrane 328.

Furthermore, as depicted, the board 304 may include a region 329, supported by other portions of the board 304, which may be thinner than the other portions and through which the acoustic port 306 and the pressure equalization port 326 may be located. The region 329 may be of a same and/or different materials as the other portions of the board 304, and the region 329 may be of a same and/or (as depicted) different thickness as the other portions of the board 304.

As depicted, the outer membrane 310 is mounted at a frame 330 (also visible in FIG. 2), through which is located an outer acoustic aperture 332 to which the outer membrane 310 is attached, to prevent moisture from entering the outer acoustic aperture 332. Put another way, the outer membrane 310 is generally non-permeable to at least moisture, and is located at the outer acoustic aperture 332 to vibrate in response to external sound (e.g. pressure waves) that arrive at a wet-side (external side) of the device 102. Put yet another way, external sound arrives at an outer side 334 (e.g. a wet-side) of the outer membrane 310, and vibrates the outer membrane 310, which in turn translates the external sound to internal sound at the dry-side (internal region) of the device 102 via the inner side 320 of the outer membrane 310. Furthermore, the outer membrane 310 generally prevents external moisture from entering the device 102.

In FIG. 4, the outer membrane 310 is depicted as partially transparent, merely to show details of the one or more condensation collection features 316 of the condensation collection apparatus 312.

While the acoustic port 306, the aperture 314, the pressure equalization port 326 and the outer acoustic aperture 332 are all depicted as circular, the acoustic port 306, the aperture 314, the pressure equalization port 326 and the outer acoustic aperture 332 may have any suitable shape. Similarly, the acoustically transparent membrane 308, the outer membrane 310, the acoustically resistant membrane 328 are also depicted as circular, however the acoustically transparent membrane 308, the outer membrane 310, the acoustically resistant membrane 328 may have any suitable shape.

The outer membrane 310 may generally comprise one or more of a hydro-phobic material and a polyether ether ketone (PEEK) based material, and/or any other suitable material that is non-permeable to at least moisture, and which translates and/or converts sound external to the device 102 to sound internal to the device 102. Furthermore, the outer membrane 310 may be of any suitable thickness which translates and/or converts sound external to the device 102 to sound internal to the device 102, and which may depend on a type of material of the acoustically transparent membrane 308.

With reference to FIG. 4, a path 402 of sound is depicted from the inner side 320 of the outer membrane 310, through the aperture 314 of the condensation collection apparatus 312 to between an inner side 404 of the condensation collection apparatus 312 and the board 304, to the acoustically transparent membrane 308, and through the acoustic port 306, where the sound is detected by the microphone 302. The path 402 illustrates that the acoustic port 306 and the aperture 314 may be unaligned and/or offset from one another (e.g. their centers are unaligned, and/or respective normal axes of the acoustic port 306 and the aperture 314 are not coincident with each other), and/or are spatially non-overlapping which may further assist with migration of condensation to the microphone 302. For example, the path 402 includes several turns which sound may easily travel, but over which condensation may less easily migrate.

However, the acoustic port 306 and the aperture 314 may have any suitable spatial relationship to each other including, but not limited to, the acoustic port 306 and the aperture 314 being aligned and/or spatially overlapping (e.g. their centers may be aligned along a common normal axis, and/or respective normal axes of the acoustic port 306 and the aperture 314 may be coincident with each other).

With further reference to FIG. 4, condensation 406 may collect at the inner side 320 of the outer membrane 310, for example in response to temperature changes at the outer side 334 of the outer membrane 310. The condensation 406 may be formed from water vapor located on the dry-side and/or interior of the device 102 (e.g. and/or the communication device 100). The condensation 406 is drawn in dashed lines to indicate that the condensation 406 is located at the inner side 320 of the outer membrane 310 (e.g. in FIG. 4, the condensation 406 is seen through the outer membrane 310).

As further depicted, the condensation 406 may fall and/or migrate onto the one or more condensation collection features 316 of the condensation collection apparatus 312, as indicated by an arrow 408, where the condensation 406 may collect as one or more condensation (e.g. moisture) droplets 410. In contrast, if the condensation collection apparatus 312 were absent from the device 102, the condensation 406 may more easily migrate to the microphone 302 and/or at least to the acoustically transparent membrane 308.

Hence, the one or more condensation collection features 316 generally collect the condensation droplets 410 and furthermore prevent the condensation droplets 410 from moving towards the aperture 314.

Figure 5:
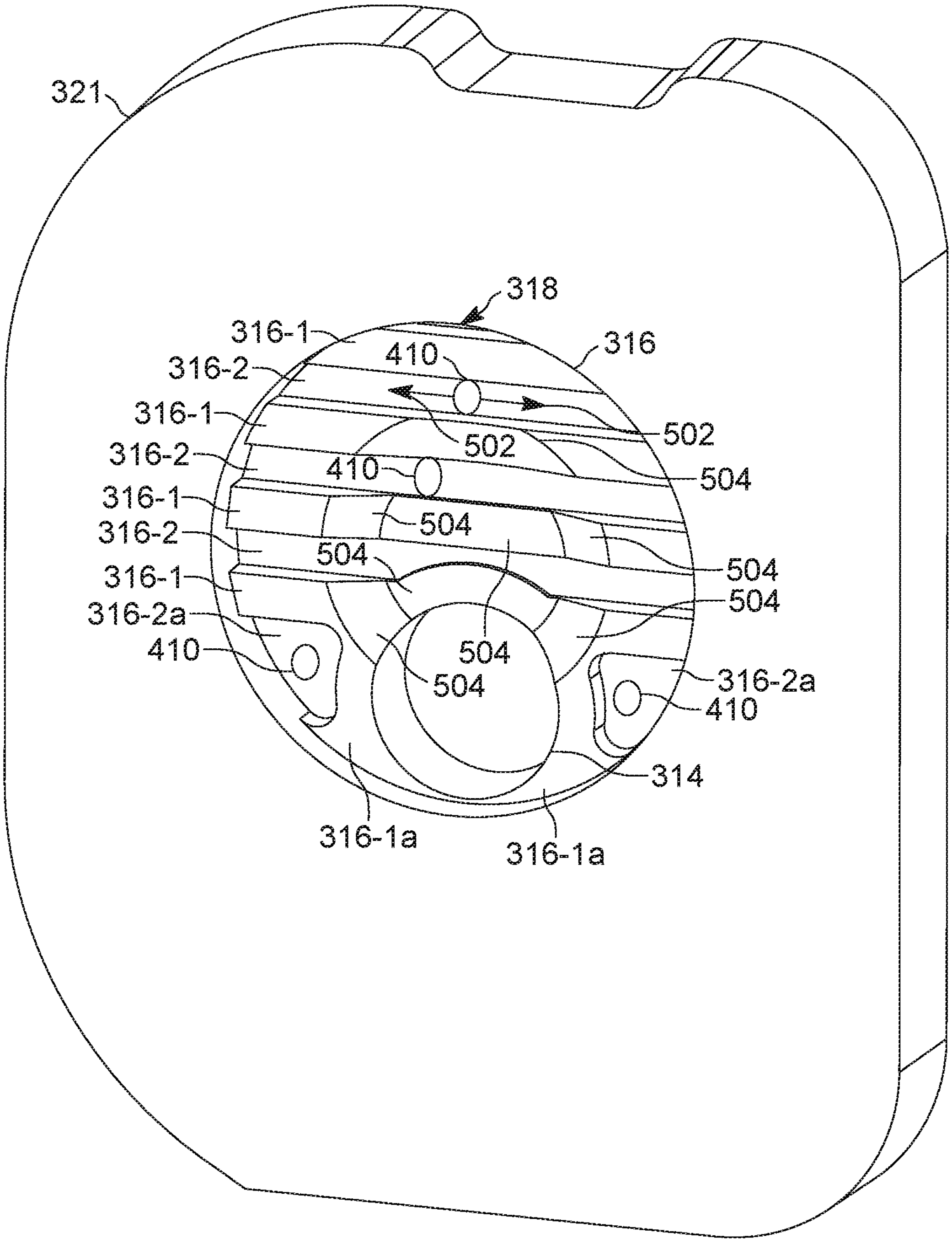
FIG. 5 depicts a perspective view of a condensation collection apparatus, in accordance with some examples.

Attention is next directed to FIG. 5 which depicts the condensation collection apparatus 312 and the one or more condensation collection features 316 in more detail. At least the one or more condensation collection features 316 may comprise any suitable hydrophilic material, including, but not limited to polyurethane, amongst other possibilities. Indeed, the condensation collection apparatus 312, including the one or more condensation collection features 316, sides of the aperture 314, and the frame 321, may comprise a unitary apparatus formed from any suitable hydrophilic material. However, the condensation collection apparatus 312 may comprise any suitable combination of one or more materials.

Furthermore, it is understood that the one or more condensation collection features 316 are generally configured to increase a surface area of the outer-membrane facing side 318, relative to a flat surface, for example to generally increase a surface area of the outer-membrane facing side 318 that may collect the condensation droplets 410. Such an increased surface area assists at collecting the condensation droplets 410 and/or condensation in any form, to prevent the condensation from migrating to the microphone 302.

In particular, as depicted in FIG. 5, the one or more condensation collection features 316 may comprise one or more raised ridges 316-1 that at least partially extend from side to side across the outer-membrane facing side 318 (e.g. to the frame 321), the one or more raised ridges 316-1 and the aperture 314 being non-intersecting.

As depicted, the one or more condensation collection features 316 may comprise one or more depressions 316-2 in the outer-membrane facing side 318, the one or more depressions 316-2 and the aperture 314 being non-intersecting.

In particular, as depicted, the ridges 316-1 and depressions 316-2 (e.g. in the form of troughs) alternate, and/are about parallel to each other, such that condensation droplets 410 (and/or condensation in any form) may collect at the ridges 316-1 and/or the depressions 316-2, and are generally arranged to prevent the condensation droplets 410, and the like, from migrating towards and/or into the aperture 314.

Put another way, the raised ridges 316-1 and depressions 316-2 may generally be configured to guide condensation droplets 410 that collect on the raised ridges 316-1 and/or and depressions 316-2, away from the aperture 314, and/or in any suitable direction that is not to and/or into the aperture.

For example, as depicted, condensation droplets 410 may collect in the depressions 316-2 and be guided to move and/or flow in directions that do not intersect the aperture 314, as represented by arrows 502. For example, the raised ridges 316-1 and/or depressions 316-2 may guide the condensation droplets 410 in a direction that is parallel to a diameter of the aperture 314, but does not intersect a perimeter of the aperture 314.

However, as at least the one or more condensation collection features 316 may comprise a hydrophilic material, the condensation droplets 410 may not move, but may "stick" and/or be attracted to the one or more condensation collection features 316. Nonetheless, as the condensation droplets 410 increase in size, for example due to smaller condensation droplets 410, collecting into larger condensation droplets 410, the condensation droplets 410 may move along the ridges 316-1 and/or the depressions 316-2, and not enter the aperture 314.

While not depicted, at ends of the ridges 316-1 and/or depressions 316-2, the frame 321 may include one or more drainage features (e.g. channels) that drain any condensation droplets 410 that reach the ends away from the aperture 314 and/or out of the device 102.

Similarly, while the one or more condensation collection features 316 generally form a circular shape within the frame 321, the one or more condensation collection features 316 may have any suitable shape. In particular, the one or more condensation collection features 316 may be formed into a circular shape that is similar in size as the circular shape of the outer membrane 310 and the circular shapes of the one or more condensation collection features 316 and the outer membrane 310 may be about aligned (e.g. such that their centers are on a same and/or similar normal axis). In some examples, the one or more condensation collection features 316 may be formed into a circular shape that is large than the outer membrane 310, for example 5% larger, 10% larger, amongst other possibilities.

It is further understood (e.g. at least from FIG. 4) that the outer-membrane facing side 318 of the condensation collection apparatus 312 is adjacent the inner side 320 of the outer membrane 310. As the outer membrane 310 is understood to vibrate, in some examples, and as depicted in FIG. 5, the condensation collection apparatus 312 may further comprise an outer membrane clearance region 504 at the outer-membrane facing side 318, the outer membrane clearance region 504 being recessed relative to adjacent portions of the outer-membrane facing side 318 to allow for vibration of the outer membrane 310. For example, in FIG. 5, the outer membrane clearance region 504 defines a circular region in the one or more ridges 316-1 that a lower, relative to the inner side 320 of the outer membrane 310, than adjacent portions of the one or more ridges 316-1 that are closer to the frame 321 and/or ends of the one or more ridges 316-1. In particular, as depicted, circular region formed by the outer membrane clearance region 504 may be in the form of a concave spherical cap and/or concave spherical dome, and the like. Dimensions of diameter and/or depth of the outer membrane clearance region 504 may be determined heuristically based on measured and/or calculated displacement of the outer membrane 310, towards the outer-membrane facing side 318 of the condensation collection apparatus 312, when the outer membrane 310 is vibrating due to receipt of sound; similarly, dimensions of diameter and/or depth of the outer membrane clearance region 504 may be further determined heuristically based on a distance between the outer-membrane facing side 318 of the condensation collection apparatus 312 and the inner side 320 of the outer membrane 310.

While the about parallel ridges 316-1 and depressions 316-2 are one example of the one or more condensation collection features 316, the one or more condensation collection features 316 may comprise any suitable combination of features that collects condensation that migrates from an inner side of the outer membrane 310; and prevents migration of the condensation, that is collected, through the aperture 314. For example, from FIG. 5, it is understood that two ridges **316-1*a* and two depressions 316-2*a* are of a different configuration than the other ridges 316-1 and depressions 316-2. For example, the two ridges 316-1*a* are not parallel to the other ridges 316-1 and depressions 316-2, but rather extend along the aperture 314, but are generally non-intersecting with the aperture 314, and/or are of a shape that promotes flow of condensation away from the aperture 314 (e.g. downward, presuming that the orientation of the communication device 100 is in an up/down position). Similarly, the two depressions 316-2*a* are not parallel to the ridges 316-1 and the other depressions 316-2, but rather form pockets on either side of the aperture 314 and/or on either side of the ridges 316-1*a* that collect condensation (e.g. the condensation droplets 410). Hence, the ridges 316-1*a* and depressions 316-2*a* illustrate that the one or more condensation collection features 316** may have any suitable configuration.

However, the one or more condensation collection features 316 may have other suitable configurations.

Figure 6:
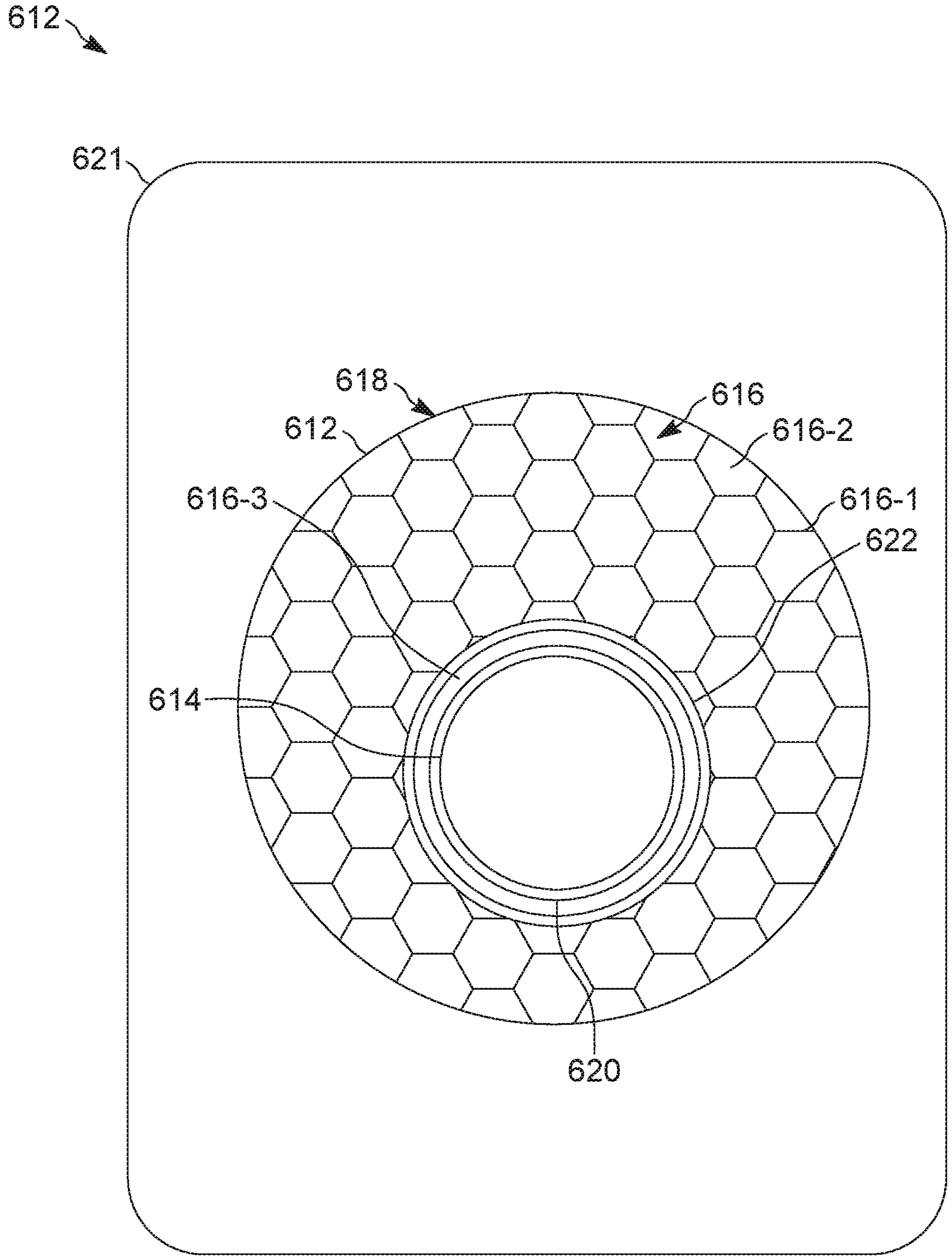
FIG. 6 depicts a front view of an alternative condensation collection apparatus, in accordance with some examples.

For example, attention is next directed to FIG. 6 which depicts an alternative condensation collection apparatus 612 comprising: an aperture 614 through which the sound from the outer membrane 310 passes; and one or more condensation collection features 616 at an outer-membrane facing side 618 of the condensation collection apparatus 612, the one or more condensation collection features 616 configured to: collect condensation that migrates from an inner side 320 of the outer membrane 310; and prevent migration of the condensation, that is collected, through the aperture 614.

The aperture 614 is understood to be similar to the aperture 314.

It is further understood that the condensation collection apparatus 612 further comprises a frame 621. While as depicted the frame 621 is a different shape as the frame 321, the frame 621 may have a same and/or similar shape as the frame 321.

In general, the condensation collection apparatus 612 may be used in place of the condensation collection apparatus 312. However, as depicted, rather than about parallel ridges and depressions, the one or more condensation collection features 616 comprises ridges 616-1 which define hexagonal depressions 616-2 that generally form a honeycomb shaped structure. Furthermore, the aperture 614 is surround by a trough 616-3 formed by a circular outer wall 620 of the aperture 614 and an opposing circular wall 622.

While the condensation collection apparatus 612 is depicted without an outer membrane clearance region, the condensation collection apparatus 612 may include an outer membrane clearance region, similar to the outer membrane clearance region 504.

The condensation collection apparatus 612 generally functions similar to the condensation collection apparatus 312, however condensation and/or condensation droplets may be collected and/or trapped in the hexagonal depressions 616-2 and/or the trough 616-3, and may not flow within the condensation collection apparatus 612 (e.g. other than around the trough 616-3).

Furthermore, while the depressions 616-2 are depicted as hexagonal, the depressions 616-2 may be of any suitable shape and size including, but not limited to, square, rectangular, circular, oval, amongst other possibilities.

Attention is next directed to FIG. 7 and FIG. 8 which depict front and rear views of a portion of the flex-PCB 200 that includes the device 102 and internal components of one of the buttons 114. FIG. 7 and FIG. 8 further illustrate that, in some examples, the optional further device 108, similar to the device 102, may be incorporated into the flex-PCB 200 and/or the communication device 100.

In particular, FIG. 7 and FIG. 8 depicts components of the device 102 when assembled. For example, FIG. 7 depicts the outer membrane 310 held by the frame 330, and a side of the condensation collection apparatus 312 (e.g. a side of the frame 321). FIG. 8 depicts a rear of the microphone 302 (e.g. as packaged), a side of the condensation collection apparatus 312 (e.g. a side of the frame 321), and a rear side of the pressure equalization port 326. While not all the components of the device 102 are depicted, they are nonetheless understood to be present.

Similarly FIG. 7 further depicts similar components of the optional further device 108. For example, FIG. 7 depicts an outer membrane 710 (e.g. similar to the outer membrane 310) held by a frame 730 (e.g. similar to the frame 330), and a side (e.g. a side of a frame similar to the frame 321) of a condensation collection apparatus 712 (e.g. similar to the condensation collection apparatus 312). FIG. 8 depicts a rear of a microphone 703 (e.g. similar to the microphone 302), a rear side of a board 704 (e.g. similar to the board 304), a side of the condensation collection apparatus 712, and a rear side of a pressure equalization port 726 (e.g. similar to the pressure equalization port 326). While not all the components of the optional further device 108 are depicted, they are nonetheless understood to be present, and are further understood to comprise the same and/or similar components of the device 102 as depicted at least in FIG. 3 and FIG. 4.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

Similarly, in this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:

a microphone;

a board having an acoustic port therethrough, the microphone positioned to accept sound through the acoustic port;

an acoustically transparent membrane over the acoustic port, the acoustically transparent membrane being moisture-resistant;

an outer membrane that receives the sound for the microphone, the outer membrane being non-permeable to at least moisture; and a condensation collection apparatus between the outer membrane and the acoustically transparent membrane, the condensation collection apparatus comprising:

- an aperture through which the sound from the outer membrane passes; and
- one or more condensation collection features at an outer-membrane facing side of the condensation collection apparatus, the one or more condensation collection features configured to: collect condensation that migrates from an inner side of the outer membrane; and prevent migration of the condensation, that is collected, through the aperture.

2. The device of claim 1, further comprising:

a pressure equalization port through the board; and an acoustically resistant membrane over the pressure equalization port, the acoustically resistant membrane being moisture-resistant.

3. The device of claim 1, wherein the one or more condensation collection features comprise one or more raised ridges that at least partially extend from side to side across the outer-membrane facing side, the one or more raised ridges and the aperture being non-intersecting.

4. The device of claim 1, wherein the one or more condensation collection features comprise one or more depressions in the outer-membrane facing side, the one or more depressions and the aperture being non-intersecting.

5. The device of claim 1, wherein the one or more condensation collection features comprise features to increase a surface area of the outer-membrane facing side relative to a flat surface.

6. The device of claim 1, wherein the condensation collection apparatus further comprises an outer membrane clearance region at the outer-membrane facing side, the outer membrane clearance region being recessed relative to adjacent portions of the outer-membrane facing side to allow for vibration of the outer membrane.

7. The device of claim 1, wherein the one or more condensation collection features comprises a hydrophilic material.

8. The device of claim 1, wherein the microphone is mounted on a side of the board opposite the acoustically transparent membrane.

9. The device of claim 1, wherein the microphone comprises a micro-electromechanical systems (MEMs) microphone.

10. The device of claim 1, wherein the microphone comprises a bottom ported MEMs microphone.

11. The device of claim 1, wherein the acoustically transparent membrane comprises one or more of a hydrophobic material and a polytetrafluoroethylene (PTFE) based material.

12. The device of claim 1, wherein the outer membrane comprises one or more of a hydro-phobic material and a polyether ether ketone (PEEK) based material.

13. The device of claim 1, further comprising an outer acoustic aperture to which the outer membrane is attached to prevent moisture from entering the outer acoustic aperture.

14. The device of claim 1, further comprising a body-wearable communication device.

15. The device of claim 1, further comprising a remote-speaker microphone.

16. The device of claim 1, further comprising a portable public safety radio.

* * * * *